United States Patent
Hang et al.

(10) Patent No.: US 12,137,373 B2
(45) Date of Patent: Nov. 5, 2024

(54) METHOD FOR DETERMINING TRANSPORT BLOCK SIZE AND COMMUNICATIONS APPARATUS

(71) Applicant: HUAWEI TECHNOLOGIES CO., LTD., Guangdong (CN)

(72) Inventors: Haicun Hang, Shanghai (CN); Shibin Ge, Shanghai (CN); Xiaohan Wang, Shanghai (CN); Liuliu Ji, Shanghai (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 386 days.

(21) Appl. No.: 17/468,269

(22) Filed: Sep. 7, 2021

(65) Prior Publication Data
US 2021/0410006 A1    Dec. 30, 2021

Related U.S. Application Data

(63) Continuation of application No. PCT/CN2020/077935, filed on Mar. 5, 2020.

(30) Foreign Application Priority Data

Mar. 5, 2019 (CN) .......... 201910165162.3
Aug. 8, 2019 (CN) .......... 201910729222.X

(51) Int. Cl.
*H04W 28/06* (2009.01)
*H04W 72/044* (2023.01)

(52) U.S. Cl.
CPC ....... *H04W 28/06* (2013.01); *H04W 72/0466* (2013.01)

(58) Field of Classification Search
None
See application file for complete search history.

(56) References Cited

U.S. PATENT DOCUMENTS

| 2010/0115358 | A1  | 5/2010  | Kotecha et al. |
| 2017/0373809 | A1* | 12/2017 | Kim ............. H04L 5/0044 |
| 2019/0059020 | A1* | 2/2019  | Ge ............... H04L 1/0007 |

FOREIGN PATENT DOCUMENTS

| CN | 101277141 A | 10/2008 |
| CN | 102104467 A | 6/2011 |

(Continued)

OTHER PUBLICATIONS

3GPP TS 38.214 V15.4.0 (Dec. 2018), 3rd Generation Partnership Project; Technical Specification Group Radio Access Network; NR; Physical layer procedures for data(Release 15), 102 pages.

(Continued)

*Primary Examiner* — Walter J Divito
(74) *Attorney, Agent, or Firm* — HUAWEI TECHNOLOGIES CO., LTD.

(57) ABSTRACT

This disclosure provides a method for determining a transport block size (TBS) of a transport block and a communications apparatus. The method includes: A communications apparatus determines a data block size corresponding to each of n code words, where the n code words correspond to a same transport block, and n is an integer greater than 1; and then, the communications apparatus determines a TBS of the transport block based on a data block size of one or more of the n code words.

20 Claims, 7 Drawing Sheets

(56) References Cited

FOREIGN PATENT DOCUMENTS

| | | | |
|---|---|---|---|
| CN | 102577215 | A | 7/2012 |
| CN | 103534969 | A | 1/2014 |
| CN | 104243086 | A | 12/2014 |
| CN | 106936486 | A | 7/2017 |
| CN | 107306453 | A | 10/2017 |
| CN | 107404378 | A | 11/2017 |
| CN | 107645370 | A | 1/2018 |
| CN | 108462556 | A | 8/2018 |
| CN | 109152052 | A | 1/2019 |
| CN | 109392100 | A | 2/2019 |
| EP | 2523517 | A1 | 11/2012 |
| EP | 3282612 | A1 | 2/2018 |
| WO | 2017197155 | A1 | 11/2017 |
| WO | 2017201704 | A1 | 11/2017 |

OTHER PUBLICATIONS

3GPP TS 38.212 V15.4.0 (Dec. 2018), 3rd Generation Partnership Project; Technical Specification Group Radio Access Network; NR; Multiplexing and channel coding(Release 15), 100 pages.

* cited by examiner

METHOD FOR DETERMINING TRANSPORT BLOCK SIZE AND COMMUNICATIONS APPARATUS

CROSS-REFERENCE TO RELATED APPLICATIONS

This application is a continuation of International Application No. PCT/CN2020/077935, filed on Mar. 5, 2020, which claims priority to Chinese Patent Application No. 201910729222.X, filed on Aug. 8, 2019 and Chinese Patent Application No. 201910165162.3, filed on Mar. 5, 2019. All of the aforementioned patent applications are hereby incorporated by reference in their entireties.

TECHNICAL FIELD

This application relates to the field of communications technologies, and in particular, to a method for determining a transport block size (TBS) and an apparatus.

BACKGROUND

With rapid development of mobile communications technologies, a communications system has a higher requirement for reliability. An ultra-reliable and low-latency communication (URLLC) service in a 5th generation (5G) system is used as an example, and reliability required by the URLLC service is up to 99.999%. To improve service reliability, a communications system may use a diversity transmission mode. In existing protocols, only TBS calculation in a spatial multiplexing scenario is considered, and how to determine a TBS in a diversity transmission scenario is not considered.

SUMMARY

This disclosure provides a method for determining a TBS and a communications apparatus, to determine a TBS of a transport block in a diversity transmission scenario.

According to a first aspect, a method for determining a TBS is provided, and includes a communications apparatus that determines a data block size of each of n code words, where the n code words correspond to a same transport block, and n is an integer greater than 1. The communications apparatus determines a TBS of the transport block based on a data block size of one or more of the n code words. Based on this, in a diversity transmission scenario, the communications apparatus can determine a TBS of a same transport block corresponding to a plurality of code words. In this way, if the communications apparatus is a network device, the network device may perform diversity transmission on the transport block based on the TBS of the transport block. If the communications apparatus is a terminal, the terminal may decode, based on the TBS of the transport block, the plurality of code words corresponding to the transport block.

In a possible design, that a communications apparatus determines a data block size of each of n code words includes: determining the data block size of each of the n code words based on control information corresponding to each of the n code words.

In a possible design, that the communications apparatus determines a TBS of the transport block based on a data block size of one or more of the n code words includes using a data block size of one of the n code words as the TBS of the transport block; using a smallest data block size in data block sizes of the n code words as the TBS of the transport block, using a largest data block size in data block sizes of the n code words as the TBS of the transport block, using an average value of data block sizes of the n code words as the TBS of the transport block, or using a sum of data block sizes of the n code words as the TBS of the transport block.

In a possible design, control information of the n code words is carried in same downlink control information (DCI).

In a possible design, control information of the n code words is carried in different DCI.

According to a second aspect, a method for determining a TBS is provided, and includes: A communications apparatus determines, based on a time-frequency resource of a first code word and a modulation and coding scheme (MCS) of the first code word, a TBS of a transport block corresponding to the first code word; and determines a TBS of a transport block corresponding to a second code word, based on the TBS of the transport block corresponding to the first code word, where the first code word and the second code word correspond to a same transport block. Based on this, in a scenario in which the first code word and the second code word correspond to the same transport block, that is, in a scenario in which the transport block is transmitted in diversity transmission mode, the communications apparatus may determine, by using the TBS of the transport block corresponding to the first code word, the TBS of the transport block corresponding to the second code word. In this way, if the communications apparatus is a network device, the network device may transmit the second code word. If the communications apparatus is a terminal, the terminal may implement joint decoding of the first code word and the second code word based on the TBS of the transport block.

In a possible design, the method further includes: The communications apparatus determines a bit rate of the second code word based on the TBS of the transport block corresponding to the second code word, a time-frequency resource corresponding to the second code word, and a modulation scheme of the second code word. Based on this design, when a bit rate corresponding to an MCS index of the second code word is a reserved value, the communications apparatus may determine the bit rate of the second code word. In this way, if the communications apparatus is a network device, the network device may transmit the second code word based on the bit rate of the second code word. If the communications apparatus is a terminal, the terminal may implement joint decoding of the first code word and the second code word based on the bit rate of the second code word.

In a possible design, an MCS index of the second code word is 28, 29, 30, or 31.

According to a third aspect, a method for determining a TBS is provided, and includes: A communications apparatus determines a quantity of diversities corresponding to a transport block, where the quantity of diversities is used to indicate a quantity of copies of the transport block that are transmitted in diversity transmission mode; and then, the communications apparatus determines a TBS of the transport block based on the quantity of diversities corresponding to the transport block. Based on the technical solution, in a diversity transmission scenario, the communications apparatus can determine an appropriate TBS for the transport block based on the quantity of diversities corresponding to the transport block. In this way, if the communications apparatus is a network device, the network device may perform diversity transmission on the transport block based on the TBS of the transport block. If the communications apparatus is a terminal, the terminal may decode the transport block based on the TBS of the transport block.

In a possible design, if the communications apparatus is a network device, the method further includes: The network device sends first indication information, where the first indication information is used to indicate the quantity of diversities corresponding to the transport block. In this way, the terminal may discern, based on the first indication information, of the quantity of diversities corresponding to the transport block.

In a possible design, if the communications apparatus is a terminal, the method further includes: The terminal receives first indication information, where the first indication information is used to indicate the quantity of diversities corresponding to the transport block. In this way, the terminal may discern, based on the first indication information, of the quantity of diversities corresponding to the transport block.

In a possible design, that the communications apparatus determines a TBS of the transport block based on the quantity of diversities corresponding to the transport block includes: determining an intermediate quantity of information bits of the transport block based on the quantity of diversities corresponding to the transport block; and determining the TBS of the transport block based on the intermediate quantity of information bits of the transport block.

In a possible design, the intermediate quantity of information bits of the transport block is determined according to the following formula: $N_{info}=N_{RE} \cdot R \cdot Q_m \cdot v/m$, where $N_{info}$ represents the intermediate quantity of information bits of the transport block, $N_{RE}$ represents a quantity of resource elements (RE) used to transmit data, R represents a bit rate, $Q_m$ represents a modulation order, v represents a quantity of transport layers, m represents the quantity of diversities corresponding to the transport block, $N_{RE}$, $Q_m$, v, and m are positive integers, and R is a positive number.

In a possible design, if the quantity of diversities for the transport block is equal to the quantity of transport layers, each of the v transport layers carries a transport block with one redundancy version (RV). The transport block with one RV includes a system bit and corresponding RV information. The system bit is useful data information.

In a possible design, transport blocks with m RVs are mapped to one code word, the code word is mapped to the v transport layers, and m is the quantity of diversities corresponding to the transport block.

In a possible design, if the communications apparatus is a network device, the method further includes: The network device sends second indication information to the terminal, where the second indication information is used to indicate an index of each of the m RVs. In this way, the terminal may discern the index of each of the m RVs by using the second indication information.

In a possible design, if the communications apparatus is a terminal, the method further includes: The terminal receives second indication information, where the second indication information is used to indicate an index of each of the m RVs. In this way, the terminal may discern the index of each of the m RVs by using the second indication information.

In a possible design, if the communications apparatus is a network device, the method further includes: The network device sends third indication information to the terminal, where the third indication information is used to indicate an index of a 15 RV in the m RVs, and indexes of the m RVs meet a preset rule. In this way, the terminal may discern an index of each of the m RVs by using the third indication information. In addition, because the third indication information indicates only the index of the $1^{st}$ RV, transmission overheads caused by the third indication information are relatively small.

In a possible design, if the communications apparatus is a terminal, the method further includes: The terminal receives third indication information, where the third indication information is used to indicate an index of a 15 RV in the m RVs, and indexes of the m RVs meet a preset rule. In this way, the terminal may discern an index of each of the m RVs by using the third indication information. In addition, because the third indication information indicates only the index of the $1^{st}$ RV, transmission overheads caused by the third indication information are relatively small.

In a possible design, when the quantity of diversities corresponding to the transport block is equal to the quantity of transport layers, each of the v transport layers corresponds to one piece of configuration information, and the configuration information corresponding to the transport layer is used to indicate an index of an RV corresponding to the transport layer. In addition, the configuration information corresponding to the transport layer is further used to indicate resource allocation and an MCS of the transport layer. It may be understood that, in a scenario in which the quantity of diversities corresponding to the transport block is equal to the quantity of transport layers, the communications apparatus may determine, based on the configuration information corresponding to each transport layer, the index of the RV corresponding to the transport layer.

In a possible design, there is a correspondence between a demodulation reference signal (DMRS) port and the RV. When the quantity of diversities corresponding to the transport block is equal to the quantity of transport layers, the correspondence between the DMRS port and the RV is used to determine an index of an RV corresponding to each of the v transport layers. In this way, in a scenario in which the quantity of diversities corresponding to the transport block is equal to the quantity of transport layers, the communications apparatus may determine a DMRS port corresponding to a transport layer, and further determine an index of an RV corresponding to the transport layer.

According to a fourth aspect, a method for determining an MCS is provided. The method includes: A terminal receives MCS indication information sent by a network device, where the MCS indication information is used to indicate an MCS index and an offset value of a first code word, and the offset value is used to indicate a difference between the MCS index of the first code word and an MCS index of a second code word. The terminal determines the MCS index of the first code word and the MCS index of the second code word based on the MCS indication information. Based on this technical solution, the terminal receives one piece of signaling (namely, the MCS indication information), and can determine MCS indexes of two code words, thereby helping reduce signaling overheads.

In a possible design, the MCS indication information includes an index parameter, and there is a correspondence between the MCS index and the offset value of the first code word and the index parameter.

According to a fifth aspect, a method for determining a TBS is provided. The method includes having A terminal receive a first and second DCI. The first DCI is used to indicate control information of n first code words, and the n first code words are obtained by mapping one transport block. The second DCI is used to indicate control information of n second code words, and the n second code words are obtained by mapping one transport block. The terminal determines a data block size of each of the n first code words based on the control information of the n first code words. The terminal determines a first TBS of the transport block based on data block sizes of the n first code words. The terminal determines a data block size of each of the n second code words based on the control information of the n second code words. The terminal determines a second TBS of the transport block based on data block sizes of the n second code words. The terminal determines a target TBS of the transport block based on the first TBS and the second TBS of the transport block. Based on the technical solution, in a diversity transmission scenario, the terminal can determine a TBS that is used, during actual transmission, by a transport block transmitted in diversity transmission mode, so that the terminal can implement joint decoding of the n first code words and the n second code words based on the TBS of the transport block.

In a possible design, that the terminal determines a target TBS of the transport block based on the first TBS and the second TBS of the transport block includes: The terminal uses the first TBS as the target TBS; the terminal uses the second TBS as the target TBS; the terminal uses an average value of the first TBS and the second TBS as the target TBS; the terminal uses a smallest value of the first TBS and the second TBS as the target TBS; or the terminal uses a largest value of the first TBS and the second TBS as the target TBS.

According to a sixth aspect, a terminal is provided, and includes: a first processing module, configured to determine a data block size of each of n code words, where the n code words correspond to a same transport block, and n is an integer greater than 1; and a second processing module, configured to determine a TBS of the transport block based on a data block size of one or more of the n code words.

In a possible design, the first processing module is specifically configured to determine the data block size of each of the n code words based on control information corresponding to each of the n code words.

In a possible design, the second processing module is specifically configured to: use a data block size of one of the n code words as the TBS of the transport block; use a smallest data block size in data block sizes of the n code words as the TBS of the transport block; use a largest data block size in data block sizes of the n code words as the TBS of the transport block; use an average value of data block sizes of the n code words as the TBS of the transport block; or use a sum of data block sizes of the n code words as the TBS of the transport block.

In a possible design, control information of the n code words is carried in same DCI.

In a possible design, control information of the n code words is carried in different DCI.

According to a seventh aspect, a terminal is provided, and includes: a first processing module, configured to determine a TBS of a transport block corresponding to a first code word, based on a time-frequency resource of the first code word and an MCS of the first code word; and a second processing module, configured to determine a TBS of a transport block corresponding to a second code word, based on the TBS of the transport block corresponding to the first code word, where the first code word and the second code word correspond to a same transport block.

In a possible design, the second processing module is further configured to determine a bit rate of the second code word based on the TBS of the transport block corresponding to the second code word, a time-frequency resource corresponding to the second code word, and a modulation scheme of the second code word.

In a possible design, an MCS index of the second code word is 28, 29, 30, or 31.

According to an eighth aspect, a terminal is provided, and includes: a first processing module, configured to determine a quantity of diversities corresponding to a transport block, where the quantity of diversities is used to indicate a quantity of copies of the transport block that are transmitted in diversity transmission mode; and a second processing module, configured to determine a TBS of the transport block based on the quantity of diversities corresponding to the transport block.

In a possible design, the terminal further includes a communication module, configured to receive first indication information, where the first indication information is used to indicate the quantity of diversities corresponding to the transport block.

In a possible design, the second processing module is specifically configured to: determine an intermediate quantity of information bits of the transport block based on the quantity of diversities corresponding to the transport block; and determine the TBS of the transport block based on the intermediate quantity of information bits of the transport block.

In a possible design, the second processing module is specifically configured to determine the intermediate quantity of information bits of the transport block according to $N_{info}=N_{RE} \cdot R \cdot Q_m \cdot v/m$, where $N_{info}$ represents the intermediate quantity of information bits of the transport block, $N_{RE}$ represents a quantity of resource elements REs used to transmit data, R represents a bit rate, $Q_m$ represents a modulation order, v represents a quantity of transport layers, m represents the quantity of diversities corresponding to the transport block, $N_{RE}$, $Q_m$, v, and m are positive integers, and R is a positive number.

In a possible design, the terminal further includes the communication module, configured to receive data carried by each of the v transport layers, where each of the v transport layers carries a transport block with one RV, and the quantity of transport layers is equal to the quantity of diversities for the transport block. The transport block with one RV includes a system bit and corresponding RV information. The system bit is useful data information.

In a possible design, the terminal further includes the communication module, configured to receive data carried by each of the v transport layers, where data carried by the v transport layers is obtained by mapping one code word, the code word is obtained by mapping transport blocks with m RVs, m is the quantity of diversities corresponding to the transport block, and v and m are positive integers.

In a possible design, the terminal further includes the communication module, configured to receive second indication information, where the second indication information is used to indicate an index of each of the m RVs.

In a possible design, the terminal further includes the communication module, configured to receive third indication information, where the third indication information is used to indicate an index of a $1^{st}$ RV in the m RVs, and indexes of the m RVs meet a preset rule.

In a possible design, the terminal further includes the communication module, configured to receive configuration information corresponding to each of the v transport layers, where the configuration information corresponding to the transport layer is used to indicate an index of an RV corresponding to the transport layer, and the quantity of transport layers is equal to the quantity of diversities for the transport block.

In a possible design, the second processing module is configured to determine an index of an RV corresponding to each of the v transport layers, based on a correspondence between an RV and a DMRS port and a relationship between a transport layer and the DMRS port, where the quantity of transport layers is equal to the quantity of diversities for the transport block.

According to a ninth aspect, a terminal is provided, and includes: a communication module, configured to receive first DCI and second DCI, where the first DCI is used to indicate control information of n first code words, and the n first code words are obtained by mapping one transport block; and the second DCI is used to indicate control information of the n second code words, and the n second code words are obtained by mapping one transport block; and a processing module, configured to: determine a data block size of each of the n first code words based on the control information of the n first code words; determine a first TBS of the transport block based on data block sizes of the n first code words; determine a data block size of each of the n second code words based on the control information of the n second code words; determine a second TBS of the transport block based on data block sizes of the n second code words; and determine a target TBS of the transport block based on the first TBS and the second TBS of the transport block.

In a possible design, the processing module is specifically configured to use the first TBS as the target TBS; use the second TBS as the target TBS; use an average value of the first TBS and the second TBS as the target TBS; use a smallest value of the first TBS and the second TBS as the target TBS; or use a largest value of the first TBS and the second TBS as the target TBS.

According to a tenth aspect, a terminal is provided, and includes: a communication module, configured to receive MCS indication information sent by a network device, where the MCS indication information is used to indicate an MCS index and an offset value of a first code word, and the offset value is used to indicate a difference between the MCS index of the first code word and an MCS index of a second code word; and a processing module, configured to determine the MCS index of the first code word and the MCS index of the second code word based on the MCS indication information.

In a possible design, the MCS indication information includes an index parameter, and there is a correspondence between the MCS index and the offset value of the first code word and the index parameter.

According to an eleventh aspect, a terminal is provided, and includes a processor and a memory, where the processor is configured to: read instructions in the memory, and implement, according to the instructions, the method according to any one of the first aspect to the fifth aspect.

According to a twelfth aspect, a computer-readable storage medium is provided. The computer-readable storage medium stores instructions, and when the instructions are run on a terminal, the terminal is enabled to perform the method according to any one of the first aspect to the fifth aspect.

According to a thirteenth aspect, a computer program product including instructions is provided. When the computer program product runs on a terminal, the terminal is enabled to perform the method according to any one of the first aspect to the fifth aspect.

According to a fourteenth aspect, a chip is provided, where the chip includes a processor, and the processor is configured to perform the method according to any one of the first aspect to the fifth aspect. In a possible design, the chip further includes a transceiver pin, and the transceiver pin is configured to transmit received code instructions to the processor, so that the processor is configured to perform the method according to any one of the first aspect to the fifth aspect. Optionally, the code instructions may be from a memory inside the chip, or may be from a memory outside the chip.

For technical effects brought by any design manner in the sixth aspect to the fourteenth aspect, refer to the technical effects in the corresponding method provided above, which are the same as the technical effects brought by the design manner. Details are not described herein again.

According to a fifteenth aspect, a network device is provided, and includes: a first processing module, configured to determine a data block size of each of n code words, where the n code words correspond to a same transport block, and n is an integer greater than 1; and a second processing module, configured to determine a TBS of the transport block based on a data block size of one or more of the n code words.

In a possible design, the first processing module is specifically configured to determine the data block size of each of the n code words based on control information corresponding to each of the n code words.

In a possible design, the second processing module is specifically configured to use a data block size of one of the n code words as the TBS of the transport block; use a smallest data block size in data block sizes of the n code words as the TBS of the transport block; use a largest data block size in data block sizes of the n code words as the TBS of the transport block; use an average value of data block sizes of the n code words as the TBS of the transport block; or use a sum of data block sizes of the n code words as the TBS of the transport block.

In a possible design, control information of the n code words is carried in same DCI.

In a possible design, control information of the n code words is carried in different DCI.

According to a sixteenth aspect, a network device is provided, and includes: a first processing module, configured to determine, based on a time-frequency resource of a first code word and an MCS of the first code word, a TBS of a transport block corresponding to the first code word; and a second processing module, configured to determine, based on the TBS of the transport block corresponding to the first code word, a TBS of a transport block corresponding to a second code word, where the first code word and the second code word correspond to a same transport block.

In a possible design, the second processing module is further configured to determine a bit rate of the second code word based on the TBS of the transport block corresponding to the second code word, a time-frequency resource corresponding to the second code word, and a modulation scheme of the second code word.

In a possible design, an MCS index of the second code word is 28, 29, 30, or 31.

According to a seventeenth aspect, a network device is provided, and includes: a first processing module, configured to determine a quantity of diversities corresponding to a transport block, where the quantity of diversities is used to indicate a quantity of copies of the transport block that are transmitted in diversity transmission mode; and a second processing module, configured to determine a TBS of the transport block based on the quantity of diversities corresponding to the transport block.

In a possible design, the network device further includes a communication module, configured to send first indication information, where the first indication information is used to indicate the quantity of diversities corresponding to the transport block.

In a possible design, the second processing module is specifically configured to: determine an intermediate quantity of information bits of the transport block based on the quantity of diversities corresponding to the transport block; and determine the TBS of the transport block based on the intermediate quantity of information bits of the transport block.

In a possible design, the second processing module is specifically configured to determine the intermediate quantity of information bits of the transport block according to $N_{info}=N_{RE} \cdot R \cdot Q_m \cdot v/m$, where $N_{info}$ represents the intermediate quantity of information bits of the transport block, $N_{RE}$ represents a quantity of resource elements REs used to transmit data, R represents a bit rate, $Q_m$ represents a modulation order, v represents a quantity of transport layers, m represents the quantity of diversities corresponding to the transport block, $N_{RE}$, $Q_m$, v, and m are positive integers, and R is a positive number.

In a possible design, the second processing module is further configured to include, in each of the v transport layers, a transport block with one RV, in other words, use each of the v transport layers to carry a transport block with one RV. The quantity of diversities for the transport block is equal to the quantity of transport layers. The transport block with one RV includes a system bit and corresponding RV information. The system bit is useful data information.

In a possible design, the second processing module is further configured to: map transport blocks with the m RVs to one code word; and map the code word to the v transport layers, where m is the quantity of diversities corresponding to the transport block.

In a possible design, the network device further includes the communication module, configured to send second indication information, where the second indication information is used to indicate an index of each of the m RVs.

In a possible design, the network device further includes the communication module, configured to send third indication information, where the third indication information is used to indicate an index of a $1^{st}$ RV in the m RVs, and indexes of the m RVs meet a preset rule.

In a possible design, the network device further includes the communication module, configured to send configuration information corresponding to each of the v transport layers, where the configuration information corresponding to the transport layer is used to indicate an index of an RV corresponding to the transport layer, and the quantity of transport layers is equal to the quantity of diversities for the transport block.

In a possible design, the second processing module is configured to determine an index of an RV corresponding to each of the v transport layers, based on a correspondence between an RV and a DMRS port and a relationship between a transport layer and the DMRS port, where the quantity of transport layers is equal to the quantity of diversities for the transport block.

According to an eighteenth aspect, a network device is provided, and includes: a processing module, configured to generate MCS indication information, where the MCS indication information is used to indicate an MCS index and an offset value of a first code word, and the offset value is used to indicate a difference between the MCS index of the first code word and an MCS index of a second code word; and a communication module, configured to send the MCS indication information to a terminal.

In a possible design, the MCS indication information includes an index parameter, and there is a correspondence between the MCS index and the offset value of the first code word and the index parameter.

According to a nineteenth aspect, a network device is provided, and includes a processor and a memory, where the processor is configured to: read instructions in the memory, and implement, according to the instructions, the method according to any one of the first aspect to the fourth aspect.

According to a twentieth aspect, a computer-readable storage medium is provided. The computer-readable storage medium stores instructions, and when the instructions are run on a network device, the network device is enabled to perform the method according to any one of the first aspect to the fourth aspect.

According to a twenty-first aspect, a computer program product including instructions is provided. When the computer program product runs on a network device, the network device is enabled to perform the method according to any one of the first aspect to the fourth aspect.

According to a twenty-second aspect, a chip is provided, where the chip includes a processor, and the processor is configured to perform the method according to any one of the first aspect to the fourth aspect. In a possible design, the chip further includes a transceiver pin, and the transceiver pin is configured to transmit received code instructions to the processor, so that the processor is configured to perform the method according to any one of the first aspect to the fifth aspect. Optionally, the code instructions may be from a memory inside the chip, or may be from a memory outside the chip.

For technical effects brought by any design manner in the fifteenth aspect to the twenty-second aspect, refer to the technical effects in the corresponding method provided above, which are the same as the technical effects brought by the design manner. Details are not described herein again.

DESCRIPTION OF EMBODIMENTS

Figure 1:
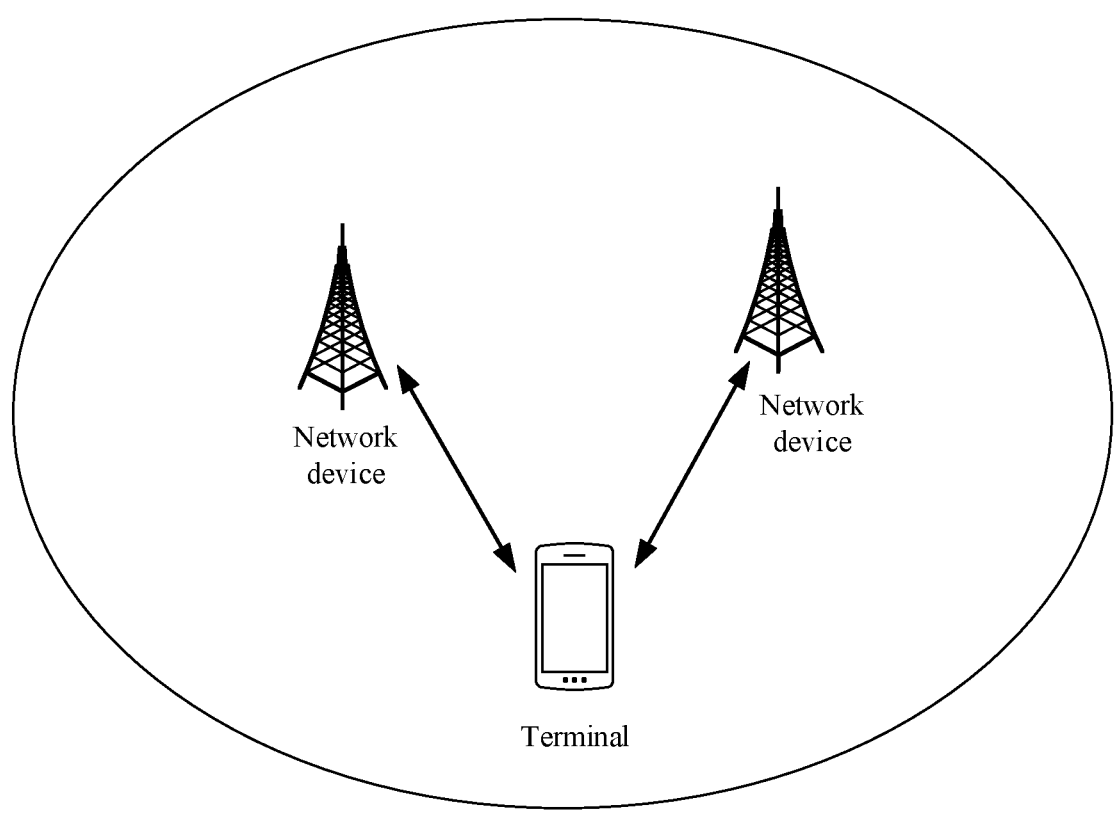
FIG. 1 is a schematic architectural diagram of a communications system according to an embodiment of this disclosure.

For ease of understanding, the following briefly describes terms used in this disclosure.

1. Transport Block (TB) and Code Word (CW)

A transport block is a basic unit for data exchange between a media access control (MAC) sublayer for physical layer processing and a physical layer. In other words, a transport block is a data block including a MAC protocol data unit (PDU).

A code word is determined after channel coding and rate matching are performed on the transport block. The code word may be mapped to one or more transport layers. Specifically, scrambling and modulation are performed on the code word to determine a complex symbol. Then, the complex symbol is mapped to one or more transport layers based on a layer mapping matrix.

2. RV

A redundancy version (RV) is used to determine a start location of a sequence that is output after channel coding is performed on a transport block. Currently, four redundancy versions RV0, RV1, RV2, and RV3 are defined in a standard. In descriptions of embodiments of this disclosure, an "RVx" is an RV whose index is "x", where x is an integer greater than or equal to 0 and less than or equal to 3. A "same RV" is an RV with a same index, and a "different RV" is an RV with a different index.

In the embodiments of this disclosure, a transport block with an RV includes a system bit and corresponding RV information. The system bit is useful data information.

3. Diversity

A diversity means that, in time, frequency, or space (such as antenna), or any combination of the preceding three dimensions, redundant transmission is performed on data to obtain a diversity gain and improve transmission reliability. Currently, diversities include but are not limited to a space-time transmit diversity (STTD), a space-frequency transmit diversity (SFTD), an orthogonal transmit diversity (OTD), a space diversity, a time diversity, a frequency domain diversity, and the like.

4. MCS

A modulation and coding scheme (MCS) is used to indicate a modulation scheme and a coding scheme. Specifically, each index value of the MCS corresponds to one modulation and coding scheme.

Currently, a correspondence between an MCS index, a modulation order, a bit rate, and spectral efficiency is defined in a standard. Refer to Table 1 (a) to Table 1 (c). It should be noted that, in different MCS tables, reserved MCS indexes are different. In Table 1 (a), when the MCS index is 29, 30, or 31, the bit rate and the spectral efficiency are reserved. In Table 1 (b), when the MCS index is 28, 29, 30, or 31, the bit rate and the spectral efficiency are reserved. In Table 1 (c), when the MCS index is 29, 30, or 31, the bit rate and the spectral efficiency are reserved.

TABLE 1 (a)

| MCS index | Modulation order | Bit rate × [1024] | Spectral efficiency |
|---|---|---|---|
| 0 | 2 | 120 | 0.2344 |
| 1 | 2 | 157 | 0.3066 |
| 2 | 2 | 193 | 0.3770 |

TABLE 1 (a)-continued

| MCS index | Modulation order | Bit rate × [1024] | Spectral efficiency |
|---|---|---|---|
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | Reserved | |
| 30 | 4 | Reserved | |
| 31 | 6 | Reserved | |

TABLE 1 (b)

| MCS index | Modulation order | Bit rate × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | Reserved | |
| 29 | 4 | Reserved | |
| 30 | 6 | Reserved | |
| 31 | 8 | Reserved | |

TABLE 1 (c)

| MCS index | Modulation order | Bit rate × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | | Reserved |
| 30 | 4 | | Reserved |
| 31 | 6 | | Reserved |

To clearly describe the technical solutions of this disclosure, the following first briefly describes an existing TBS calculation procedure.

(1) A terminal first determines a quantity $N_{RE}'$ of REs in a physical resource block (PRB) that are allocated to a physical downlink shared channel (PDSCH).

$N_{RE}' = N_{SC}^{RB} \cdot N_{symb}^{sh} - N_{DMRS}^{PRB} - N_{oh}^{PRB}$. $N_{SC}^{RB}$ is a quantity of subcarriers in an RB. $N_{symb}^{sh}$ is a quantity of symbols in a slot that are allocated to the PDSCH. $N_{DMRS}^{PRB}$ is a quantity of REs in each RB that are used for a DMRS within predetermined duration. $N_{oh}^{PRB}$ is overheads configured by using an xOverhead parameter in a physical downlink shared channel-serving cell configuration (PDSCH-ServingCellConfig). It should be noted that, if the xOverhead parameter in PDSCH-ServingCellConfig is not configured, it is assumed that $N_{oh}^{PRB}$ is 0.

Then, the terminal determines a total quantity $N_{RE}$ of REs allocated to the PDSCH.

$N_{RE} \cdot n_{PRB}$ is a total quantity of PRBs allocated to the terminal.

(2) The terminal determines an intermediate quantity of information bits.

$N_{info} = N_{RE} \cdot R \cdot Q_m \cdot v$. $N_{info}$ represents the intermediate quantity of information bits. R represents a bit rate. $Q_m$ represents a modulation order. v represents a quantity of transport layers.

If $N_{info} \leq 3824$, the following operation (3) is performed to determine a TBS. Otherwise, the following operation (4) is performed to determine a TBS.

(3) When $N_{info} \leq 3824$, the TBS is determined in the following manner:

The terminal first determines a quantized intermediate quantity $N_{info}'$ of information bits.

$$N_{info}' = \max\left(24, 2^n \cdot \left\lfloor \frac{N_{info}}{2^n} \right\rfloor \right),$$

where $n = \max(3, \lfloor \log_2(N_{info}) \rfloor - 6)$.

Then, the terminal searches Table 2 to determine a TBS that is not less than $N_{info}'$ and closest to $N_{info}'$.

TABLE 2

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |

TABLE 2-continued

| Index | TBS |
|---|---|
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

(4) When $N_{info} > 3824$, the TBS is determined in the following manner:

The terminal first determines a quantized intermediate quantity $N_{info}$ of information bits $$N'_{info} = \max\left(3840, 2^n \times \text{round}\left(\frac{N_{info} - 24}{2^n}\right)\right),$$

where $$n = \lfloor \log_2(N_{info} - 24) \rfloor - 5,$$

and round represents a circular function.

If $R \leq \frac{1}{4}$, $TBS = 8 \cdot C \cdot \left\lceil \frac{N'_{info} + 24}{8 \cdot C} \right\rceil - 24$, where $$C = \left\lceil \frac{N'_{info} + 24}{3816} \right\rceil.$$

If $R > \frac{1}{4}$ and $N'_{info} > 8424$, $TBS = 8 \cdot C \cdot \left\lceil \frac{N'_{info} + 24}{8 \cdot C} \right\rceil - 24$, where $$C = \left\lceil \frac{N'_{info} + 24}{8424} \right\rceil.$$

If $R > \frac{1}{4}$ and $N'_{info} \leq 8424$, $TBS = 8 \cdot \left\lceil \frac{N'_{info} + 24}{8} \right\rceil - 24$.

The preceding content is a brief introduction to the TBS calculation procedure. For specific details of the TBS calculation procedure, refer to related descriptions of the 3rd generation partnership project (3GPP) technical specification (TS) 38.214.

In descriptions of this disclosure, the "indication" may include a direct indication and an indirect indication, or may include an explicit indication and an implicit indication. Information indicated by a piece of information (such as first indication information and second indication information described below) is referred to as to-be-indicated information. In a specific implementation process, there are a plurality of manners of indicating the to-be-indicated information. For example, the to-be-indicated information may be directly indicated, where the to-be-indicated information itself, an index of the to-be-indicated information, or the like is indicated. For another example, the to-be-indicated information may be indirectly indicated by indicating other information, and there is an association relationship between the other information and the to-be-indicated information. For another example, only a part of the to-be-indicated information may be indicated, and the other part of the to-be-indicated information is already known or pre-agreed on. In addition, specific information may also be indicated by using a pre-agreed (for example, stipulated in a protocol) arrangement sequence of various pieces of information, to reduce indication overheads to some extent.

The embodiments of this disclosure may be used in various communications systems, for example, a new radio (NR) communications system using a 5G communications technology, a future evolved system, and various convergence communications systems. The technical solutions provided in this disclosure may be used in a plurality of disclosure scenarios, for example, scenarios such as machine to machine (M2M), macro-micro communication, enhanced mobile broadband (eMBB), uRLLC, and massive machine-type communications (mMTC). These scenarios may include but are not limited to a scenario of communication between communications devices, a scenario of communication between network devices, a scenario of communication between a network device and a communications device, and the like. The following provides descriptions by using an example in which the technical solutions are applied to a scenario in which a network device communicates with a terminal.

FIG. 1 is a schematic diagram of a communications system to which a technical solution provided in this disclosure is applicable. The communications system may include one or more network devices (where FIG. 1 shows only two network devices) and one or more terminals (where FIG. 1 shows only one terminal). One terminal may simultaneously communicate with a plurality of network devices. Alternatively, one terminal communicates with one network device. FIG. 1 is merely a schematic diagram, and does not constitute a limitation on a scenario to which a technical solution provided in this disclosure is applicable.

The network device may be a base station, a base station controller, or the like in wireless communication. The base station may include various types of base stations, such as a micro base station (also referred to as a small cell), a macro base station, a relay node, and an access point. This is not specifically limited in the embodiments of this disclosure. In the embodiments of this disclosure, the base station may be a base transceiver station (BTS) in a global system for mobile communications (GSM) or code division multiple access (CDMA), a NodeB in wideband code division multiple access (WCDMA), an evolved NodeB (eNB or e-NodeB) in long term evolution (LTE), an eNB in the internet of things (IoT) or the narrowband internet of things (NB-IoT), or a base station in a future 5G mobile communications network or a future evolved public land mobile network (PLMN). This is not limited in the embodiments of this disclosure.

A network device described in this disclosure, for example, a base station, usually includes a baseband unit (BBU), a remote radio unit (RRU), an antenna, and a feeder used to connect the RRU and the antenna. The BBU is configured to be responsible for signal modulation. The RRU is configured to be responsible for radio frequency processing. The antenna is configured to be responsible for conversion between a pilot wave on a cable and a space wave in the air. On one hand, a distributed base station greatly shortens a length of the feeder between the RRU and the antenna, thereby reducing a signal loss, and reducing costs of the feeder. On the other hand, the RRU and the antenna are relatively small and can be installed anywhere, making network planning more flexible. The RRU may be remotely placed. In addition to that, all BBUs may be centralized and placed in a central office (CO). In this centralized manner, a quantity of base station equipment rooms can be greatly reduced, energy consumption of auxiliary devices, especially air conditioners, can be reduced, and carbon dioxide ($CO_2$) emissions can be greatly reduced. In addition, after distributed BBUs are integrated into a BBU baseband pool, the BBUs can be managed and scheduled centrally, and resources can be allocated more flexibly. In this mode, all physical base stations evolve into virtual base stations. All the virtual base stations share information such as data sent and received by users and channel quality in the BBU baseband pool, and cooperate with each other, to implement joint scheduling.

The terminal is configured to provide a user with a voice or data connectivity service, or voice and data connectivity services. The terminal may have different names, for example, user equipment (UE), an access terminal, a terminal unit, a terminal station, a mobile station, a mobile console, a remote station, a remote terminal, a mobile device, a wireless communications device, a terminal agent, or a terminal apparatus. Optionally, the terminal may be any type of handheld device, vehicle-mounted device, wearable device, or computer that has a communication function. This is not limited in the embodiments of this disclosure. For example, the handheld device may be a smartphone. The vehicle-mounted device may be an in-vehicle navigation system. The wearable device may be a smart band or a virtual reality (VR) device. The computer may be a personal digital assistant (PDA) computer, a tablet computer, or a laptop computer.

In addition, a network architecture and a service scenario that are described in the embodiments of this disclosure are intended to describe the technical solutions in the embodiments of this disclosure more clearly, and do not constitute a limitation on the technical solutions provided in the embodiments of this disclosure. A person of ordinary skill in the art may learn that with evolution of the network architecture and emergence of a new service scenario, the technical solutions provided in the embodiments of this disclosure are also applicable to similar technical problems.

Figure 2:
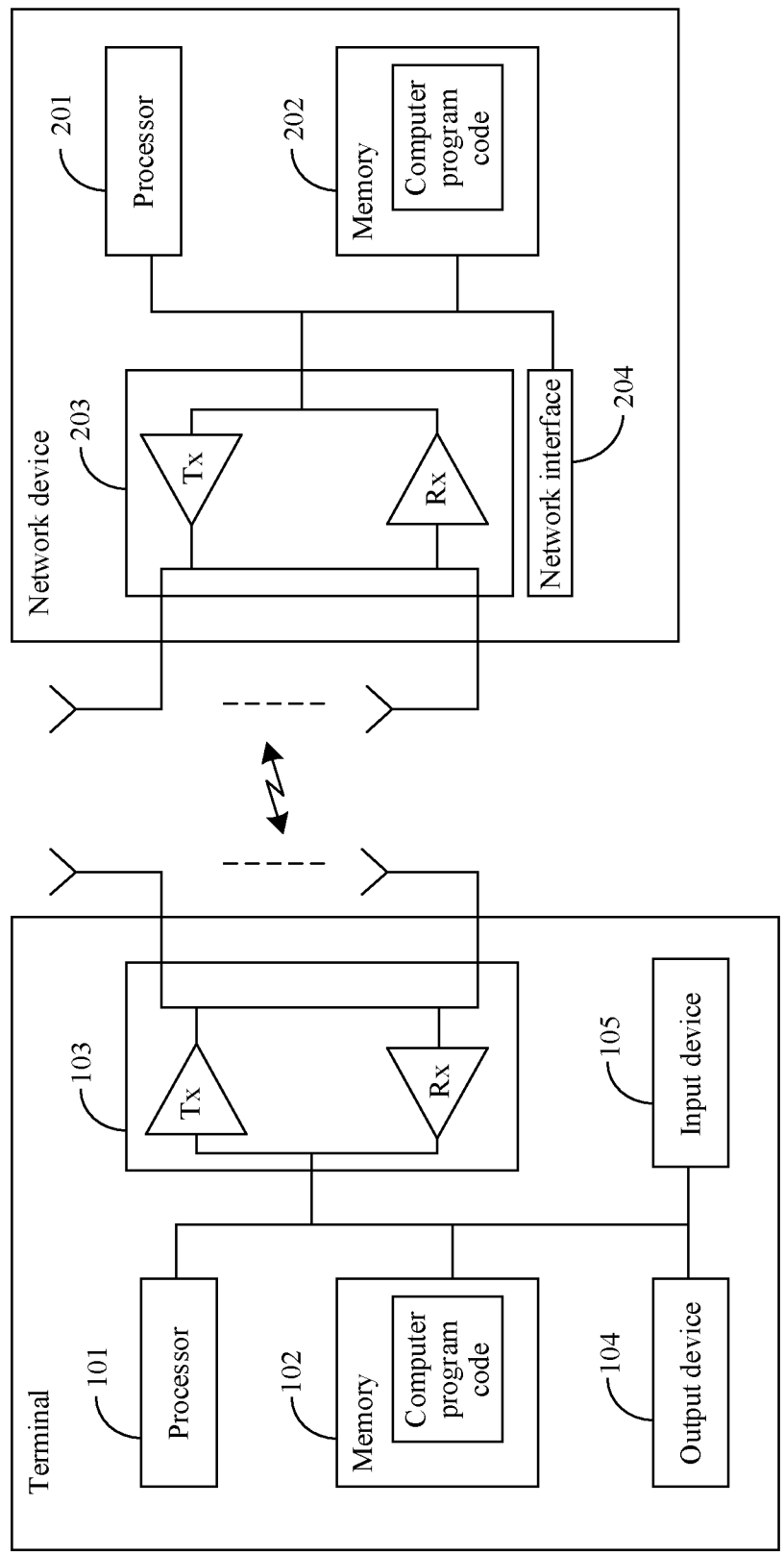
FIG. 2 is a schematic structural diagram of a terminal and an access network device according to an embodiment of this disclosure.

FIG. 2 is a schematic diagram of hardware structures of a network device and a terminal according to an embodiment of this disclosure.

The terminal includes at least one processor 101 and at least one transceiver 103. Optionally, the terminal may further include an output device 104, an input device 105, and at least one memory 102.

The processor 101, the memory 102, and the transceiver 103 are connected via a bus. The processor 101 may be a general-purpose central processing unit (CPU), a microprocessor, an application-specific integrated circuit (ASIC), or one or more integrated circuits configured to control program execution of the solutions of this disclosure. The processor 101 may alternatively include a plurality of CPUs, and the processor 101 may be a single-core (single-CPU) processor or a multi-core (multi-CPU) processor. The processor herein may refer to one or more devices, circuits, or processing cores configured to process data (for example, computer program instructions).

The memory 102 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of instructions or a data structure and that can be accessed by a computer. This is not limited in the embodiments of this disclosure. The memory 102 may exist independently, and is connected to the processor 101 via the bus. Alternatively, the memory 102 may be integrated with the processor 101. The memory 102 is configured to store disclosure program code for executing a solution in this disclosure, and the processor 101 controls the execution of the disclosure program code. The processor 101 is configured to execute the computer program code stored in the memory 102, to implement a method provided in the embodiments of this disclosure.

The transceiver 103 may use any apparatus such as a transceiver, and is configured to communicate with another device or a communications network such as the Ethernet, a radio access network (RAN), or a wireless local area network (WLAN). The transceiver 103 includes a transmitter Tx and a receiver Rx. This communication may be conducted through a physical connection, such as a connection using a wire, or through the air, using a wireless connection.

The output device 104 communicates with the processor 101, and may display information in a plurality of manners. For example, the output device 104 may be a liquid crystal display (LCD), a light emitting diode (LED) display device, a cathode ray tube (CRT) display device, or a projector. The input device 105 communicates with the processor 101, and may receive an input from a user in a plurality of manners. For example, the input device 105 may be a mouse, a keyboard, a touchscreen device, or a sensing device.

The network device includes at least one processor 201, at least one memory 202, at least one transceiver 203, and at least one network interface 204. The processor 201, the memory 202, the transceiver 203, and the network interface 204 are connected by using a bus. The network interface 204 is configured to connect to a core network device through a link (for example, an S1 interface), or connect to a network interface of another network device through a wired or wireless link (for example, an X2 interface) (not shown in the figure). This is not specifically limited in the embodiments of this disclosure. In addition, for related descriptions of the processor 201, the memory 202, and the transceiver 203, refer to the descriptions of the processor 101, the memory 102, and the transceiver 103 in the terminal. Details are not described herein again.

It should be noted that, for ease of description, the terminal and the network device are collectively referred to as communications apparatuses below.

The following describes the technical solutions in the embodiments of this disclosure with reference to accompanying drawings in the embodiments of this disclosure.

Embodiment 1

Figure 3:
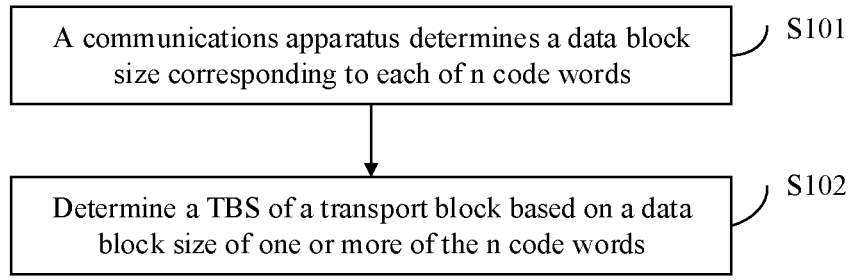
FIG. 3 is a flowchart of a method for determining a TBS according to an embodiment of this disclosure.

FIG. 3 shows a method for determining a TBS according to an embodiment of this disclosure. The method includes the following operations.

S101: A communications apparatus determines a data block size corresponding to each of n code words, where the n code words correspond to a same transport block, and n is an integer greater than 1.

In an implementation, the communications apparatus determines, based on control information corresponding to each of the n code words, the data block size corresponding to each of the n code words. The control information of the code word is used to indicate a time-frequency resource, an MCS, and the like corresponding to the code word.

It may be understood that, if the communications apparatus is a terminal, the terminal may obtain, from a network device, the control information corresponding to each of the n code words.

In this embodiment of this disclosure, control information of the n code words may be carried in same DCI, or may be carried in different DCI.

It should be noted that, for a specific implementation of "determining a data block size corresponding to each of the n code words", refer to the foregoing method for determining a TBS. Details are not described herein again.

S102: The communications apparatus determines a TBS of the transport block based on a data block size of one or more of the n code words.

In an implementation, each of the n code words is obtained by mapping one transport block. In this way, each of the n code words carries a same system bit. It should be noted that the system bit is useful data information. In this case, operation S102 may be implemented by using any one of the following manner 1 to manner 4.

It should be noted that the n code words may correspond to different RVs of the transport block. Alternatively, the n code words may correspond to a same RV of the transport block.

Manner 1: The communications apparatus uses a data block size of one of the n code words as the TBS of the transport block.

For example, the communications apparatus may use a data block size of any one of the n code words as the TBS of the transport block.

For example, the communications apparatus may use a data block size of a code word that corresponds to a preset redundancy version and that is in the n code words as the TBS of the transport block. For example, the communications apparatus uses a data block size of a code word that corresponds to an RV0 and that is in the n code words as the TBS of the transport block.

Manner 2: The communications apparatus uses a smallest data block size in n data block sizes as the TBS of the transport block. The n data block sizes are in a one-to-one correspondence with the n code words.

For example, the n code words are a code word #1, a code word #2, and a code word #3. If a data block size of the code word #1 is 224 bits, a data block size of the code word #2 is 240 bits, and a data block size of the code word #3 is 256 bits, the communications apparatus can determine that the TBS of the transport block is 224 bits.

Manner 3: The communications apparatus uses a largest data block size in n data block sizes as the TBS of the transport block. The n data block sizes are in a one-to-one correspondence with the n code words.

For example, the n code words are a code word #1, a code word #2, and a code word #3. If a data block size of the code word #1 is 224 bits, a data block size of the code word #2 is 240 bits, and a data block size of the code word #3 is 256 bits, the communications apparatus can determine that the TBS of the transport block is 256 bits.

Manner 4: The communications apparatus uses an average value of n data block sizes as the TBS of the transport block. The n data block sizes are in a one-to-one correspondence with the n code words.

For example, the n code words are a code word #1, a code word #2, and a code word #3. If a data block size of the code word #1 is 224 bits, a data block size of the code word #2 is 240 bits, and a data block size of the code word #3 is 256 bits, the communications apparatus can determine that the TBS of the transport block is 240 bits.

The foregoing manner 1 to manner 4 are merely examples of the method for determining a TBS of a transport block, and this embodiment of this disclosure is not limited thereto.

In another implementation, if the n code words are obtained by mapping one transport block, in other words, each of the n code words carries a part of one transport block, operation S102 may be implemented in the following manner 5.

It may be understood that, when the n code words are obtained by mapping one transport block, the n code words correspond to a same RV of the transport block.

Manner 5: The communications apparatus uses a sum of n data block sizes as the TBS of the transport block, and n data blocks are in a one-to-one correspondence with the n code words.

For example, the n code words are a code word #1, a code word #2, and a code word #3. If a data block size of the code word #1 is 224 bits, a data block size of the code word #2 is 240 bits, and a data block size of the code word #3 is 256 bits, the communications apparatus can determine that the TBS of the transport block is 720 bits.

Optionally, the n code words may correspond to different time domain resources. For example, the n code words correspond to n time units, that is, each code word corresponds to one time unit. The time unit is a slot or a mini-slot.

Optionally, the n code words may correspond to different frequency domain resources. The frequency domain resources corresponding to the n code words may be in a same time unit or in different time units.

Optionally, the n code words may correspond to different time-frequency domain resources. The time-frequency resources corresponding to the n code words may be in a same time unit, or may be in different time units.

It should be noted that, in a scenario in which a transport block with one RV is mapped to obtain the n code words, the terminal receives n pieces of first data. Then, the terminal splices the n pieces of first data in a specific sequence based on the TBS of the transport block and performs decoding, to determine second data. The n pieces of first data are in a one-to-one correspondence with the n code words, and the first data is generated by mapping the code word. The second data is data carried in the transport block. A cyclic redundancy check (CRC) further needs to be performed on data obtained by the terminal through decoding, to ensure that the data obtained through decoding is the correct second data.

Based on this technical solution, if the communications apparatus is a network device, the network device may determine a TBS of a same transport block corresponding to a plurality of code words, to implement diversity transmission on the transport block. If the communications apparatus is a terminal, the terminal may determine a TBS of a same transport block corresponding to a plurality of code words, to decode the plurality of code words corresponding to the transport block.

Embodiment 2

Figure 4:
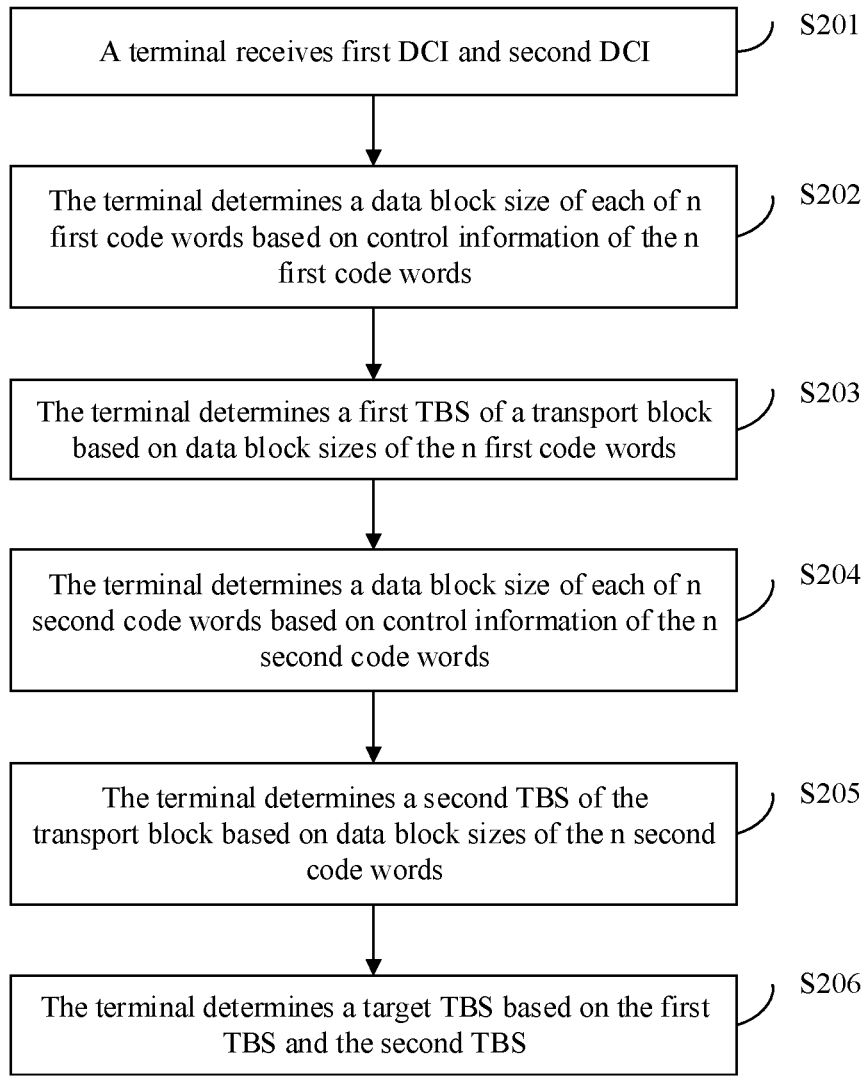
FIG. 4 is a flowchart of another method for determining a TBS according to an embodiment of this disclosure.

FIG. 4 shows a method for determining a TBS according to an embodiment of this disclosure. The method includes the following operations.

S201: A terminal receives first DCI and second DCI.

The first DCI is used to indicate control information of n first code words. The n first code words are obtained by mapping one transport block, in other words, each of the n first code words carries a part of the transport block. The n first code words correspond to a same RV of the transport block.

The second DCI is used to indicate control information of n second code words. The n second code words are obtained by mapping one transport block. In other words, each of the n second code words carries a part of the transport block. The n second code words correspond to a same RV of the transport block.

It may be understood that the RV corresponding to the first code words may be the same as or different from the RV corresponding to the second code words. This is not limited in this embodiment of this disclosure.

S202: The terminal determines a data block size of each of the n first code words based on the control information of the n first code words.

S203: The terminal determines a first TBS of the transport block based on data block sizes of the n first code words.

In an implementation, the terminal uses a sum of the data block sizes of the n first code words as the first TBS of the transport block.

S204: The terminal determines a data block size of each of the n second code words based on the control information of the n second code words.

S205: The terminal determines a second TBS of the transport block based on data block sizes of the n second code words.

In an implementation, the terminal uses a sum of the data block sizes of the n second code words as the second TBS of the transport block.

It should be noted that a sequence of performing operations S202 and S203 and operations S204 and S205 is not limited in this embodiment of this disclosure. To be specific, operations S202 and S203 may be first performed, and then operations S204 and S205 are performed. Alternatively, operations S204 and S205 are first performed, and then operations S202 and S203 are performed. Alternatively, operations S202 and S203 and operations S204 and S205 are simultaneously performed.

S206: The terminal determines a target TBS based on the first TBS and the second TBS of the transport block.

The target TBS is a TBS used by the transport block during actual transmission, namely, a TBS that is used when the transport block is mapped to obtain the n first code words, and a TBS that is used when the transport block is mapped to obtain the n second code words.

For example, the terminal uses the first TBS as the target TBS; the terminal uses the second TBS as the target TBS; the terminal uses an average value of the first TBS and the second TBS as the target TBS; the terminal uses a smallest value of the first TBS and the second TBS as the target TBS; or the terminal uses a largest value of the first TBS and the second TBS as the target TBS.

Figure 5:
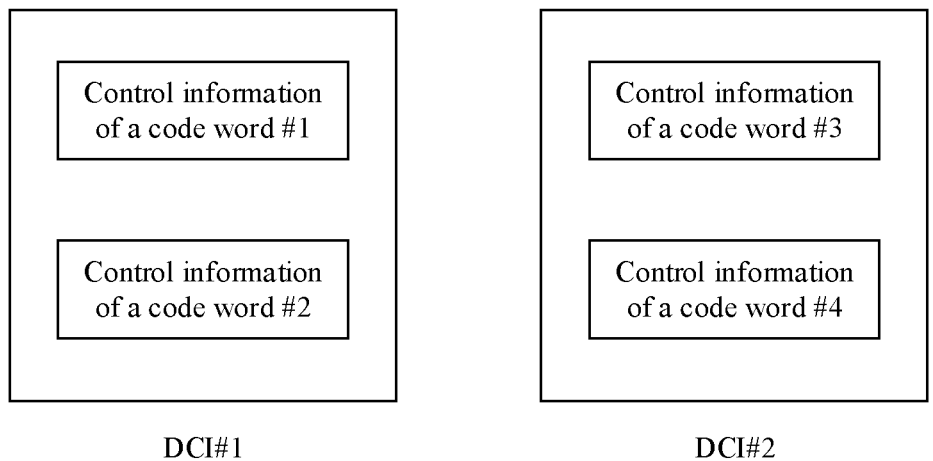
FIG. 5 is a schematic diagram of DCI according to an embodiment of this disclosure.

An example is used for description with reference to FIG. 5. DCI #1 is used to indicate control information of a code word #1 and control information of a code word #2, and DCI #2 is used to indicate control information of a code word #3 and control information of a code word #4. It is assumed that a data block size of the code word #1 is 160 bits, a data block size of the code word #2 is 168 bits, a data block size of the code word #3 is 176 bits, and a data block size of the code word #4 is 160 bits. In this way, it can be determined that a TBS of a transport block corresponding to the code word #1 and the code word #2 is 328 bits, and a TBS of a transport block corresponding to the code word #3 and the code word #4 is 336 bits. If the average value of the first TBS and the second TBS is used as the target TBS, the terminal can determine that the TBS, during actual transmission, of the transport block corresponding to the code word #1 and the code word #2 is 332 bits, and the TBS, during actual transmission, of the transport block corresponding to the code word #3 and the code word #4 is 332 bits.

Based on the technical solution shown in FIG. 4, in a diversity transmission scenario, the terminal can determine a TBS that is used, during actual transmission, by a transport block transmitted in diversity transmission mode, so that the terminal can implement joint decoding of the n first code words and the n second code words based on the TBS of the transport block.

Embodiment 3

Figure 6:
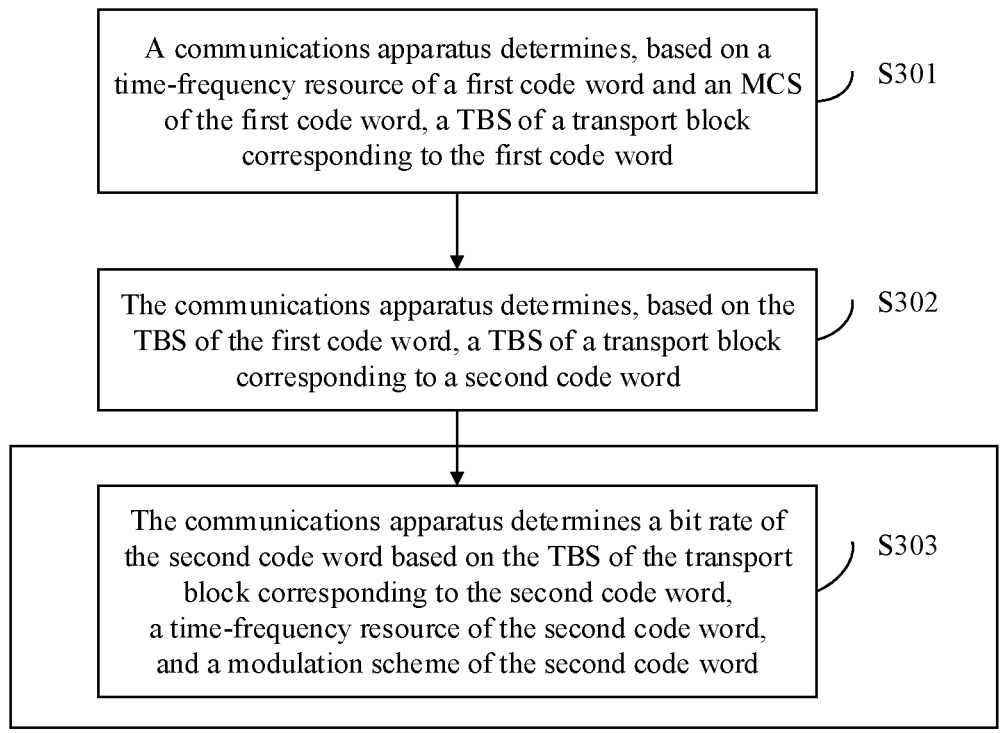
FIG. 6 is a flowchart of another method for determining a TBS according to an embodiment of this disclosure.

FIG. 6 shows a method for determining a TBS according to an embodiment of this disclosure. The method includes the following operations.

S301: A communications apparatus determines, based on a time-frequency resource of a first code word and an MCS of the first code word, a TBS of a transport block corresponding to the first code word.

For a method for determining the TBS of the first code word, refer to a current technology. Details are not described herein again.

S302: The communications apparatus determines, based on the TBS of the transport block corresponding to the first code word, a TBS of a transport block corresponding to a second code word.

The second code word and the first code word correspond to a same transport block. Therefore, the TBS of the transport block corresponding to the first code word is equal to the TBS of the transport block corresponding to the second code word.

In this embodiment of this disclosure, a network device may send diversity indication information to the terminal, and the diversity indication information is used to indicate the network device to send the transport block in a code word diversity manner. In this way, the terminal may determine, based on the foregoing operations S301 and S302, the TBS of the transport block corresponding to the second code word.

Optionally, after operation S302, the method further includes operation S303.

S303: The communications apparatus determines a bit rate of the second code word based on the TBS of the transport block corresponding to the second code word, a time-frequency resource corresponding to the second code word, and a modulation scheme of the second code word. In an implementation, if the communications apparatus is a terminal, when a bit rate corresponding to an MCS index of the second code word is a reserved value, and the terminal receives the diversity indication information, the terminal determines the bit rate of the second code word based on the TBS of the transport block corresponding to the second code word, the time-frequency resource corresponding to the second code word, and the modulation scheme of the second code word.

In another implementation, if the communications apparatus is a terminal, when a bit rate corresponding to an MCS index of the second code word is a reserved value, and a new data indicator (NDI) is used to indicate that the code word is newly transmitted data, the terminal determines the bit rate of the second code word based on the TBS of the transport block corresponding to the second code word, the time-frequency resource corresponding to the second code word, and the modulation scheme of the second code word.

It should be noted that, with reference to Table 1 (a) or Table 1 (c), when the MCS index of the second code word is 29, 30, or 31, the bit rate corresponding to the MCS index of the second code word is the reserved value. With reference to Table 1 (b), when the MCS index corresponding to the second code word is 28, 29, 30, or 31, the bit rate corresponding to the MCS index of the second code word is the reserved value.

It may be understood that the technical solution shown in FIG. 6 is applicable to a scenario in which the transport block is sent in the code word diversity manner. A bit rate corresponding to an MCS index indicated by control information of one code word is not a reserved value, and a bit rate corresponding to an MCS index indicated by control information of the other code word is a reserved value.

In an implementation, a protocol specifies that the first code word and the second code word use a same modulation scheme. If the communications apparatus is a terminal, when the terminal receives the diversity indication information, the terminal first determines the modulation scheme of the second code word based on a modulation scheme of the first code word, and the terminal determines the bit rate of the second code word based on the TBS of the transport block corresponding to the second code word, the time-frequency resource corresponding to the second code word, and the modulation scheme of the second code word.

Based on the technical solution shown in FIG. 6, the communications apparatus may determine the bit rate of the second code word by using related information (for example, the MCS and the time-frequency resource) of the first code word. In this way, if the communications apparatus is a network device, the network device may transmit the second code word based on the bit rate of the second code word. If the communications apparatus is a terminal, the terminal may implement joint decoding of the first code word and the second code word based on the bit rate of the second code word. For example, S303 has another implementation: The communications apparatus determines the bit rate of the second code word based on the TBS of the transport block corresponding to the second code word, the time-frequency resource corresponding to the second code word, and a modulation scheme of the first code word. In an implementation, a protocol specifies that the first code word and the second code word use a same modulation scheme. If the communications apparatus is a terminal, when the terminal receives the diversity indication information, the terminal determines the bit rate of the second code word based on the TBS of the transport block corresponding to the second code word, the time-frequency resource corresponding to the second code word, and the modulation scheme of the first code word.

Embodiment 4

Currently, when two code words need to be transmitted, a network device sends an MCS index of each of the two code words to a terminal. In this way, signaling overheads are relatively high.

Figure 7:
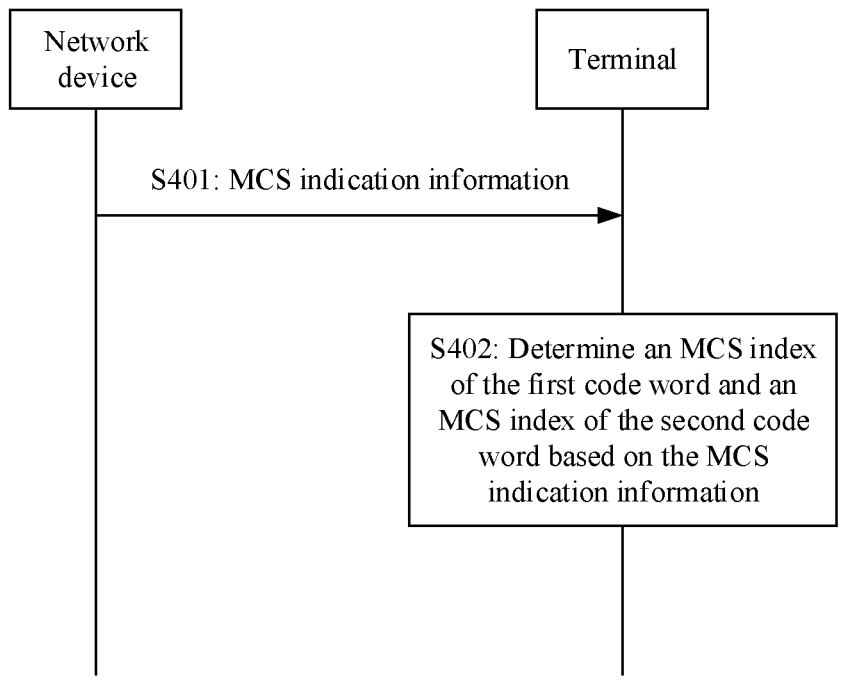
FIG. 7 is a flowchart of a method for determining an MCS according to an embodiment of this disclosure.

To resolve the technical problem, an embodiment of this disclosure provides an MCS determining method. As shown in FIG. 7, the method includes the following operations.

S401: The network device sends MCS indication information to the terminal.

The MCS indication information is used to indicate an MCS index and an offset value of the first code word.

In this embodiment of this disclosure, the offset value is a difference between the MCS index of the first code word and an MCS index of a second code word. To be specific, the offset value is equal to the MCS index of the first code word minus the MCS index of the second code word. Alternatively, the offset value is equal to the MCS index of the second code word minus the MCS index of the first code word.

Optionally, the MCS indication information may directly indicate the MCS index and the offset value of the first code word. For example, the MCS indication information includes the MCS index and the offset value of the first code word.

Optionally, the MCS indication information may indirectly indicate the MCS index and the offset value of the first code word. For example, the MCS indication information includes an index parameter. There is a correspondence between the MCS index and the offset value of the first code word and the index parameter. For example, for the correspondence between the MCS index and the offset value of the first code word and the index parameter, refer to Table 3.

TABLE 3

| Index parameter | MCS index of the first code word | Offset value |
| --- | --- | --- |
| 0 | 1 | 3 |
| 1 | 3 | 4 |
| ... | ... | ... |

It may be understood that the correspondence between the MCS index and the offset value of the first code word and the index parameter may be defined in a standard, or may be determined through negotiation between the network device and the terminal. This is not limited in this embodiment of this disclosure.

S402: The terminal determines the MCS index of the first code word and the MCS index of the second code word based on the MCS indication information.

In an implementation, the terminal determines the MCS index of the first code word based on the MCS index that is of the first code word and that is indicated by the MCS indication information. In addition, the terminal determines the MCS index of the second code word based on the MCS index and the offset value that are of the first code word and that are indicated by the MCS indication information.

For example, assuming that the offset value is equal to the MCS index of the first code word minus the MCS index of the second code word, the MCS index that is of the first code word and that is indicated by MCS indication information is 3, and the offset value is 2, the terminal can determine that the MCS index of the first code word is 3 and the MCS index of the second code word is 1.

According to the method shown in FIG. 7, the network device sends one piece of MCS indication information to the terminal, so that the terminal can learn of MCSs of two code words, thereby reducing signaling overheads.

It may be understood that the technical solution shown in FIG. 7 may be used in a code word diversity scenario. In the code word diversity scenario, channel conditions of transmitting links corresponding to two code words are similar. Therefore, MCSs of the two code words are also similar. Using the technical solution shown in FIG. 7 helps reduce the signaling overheads.

Embodiment 5

Figure 8:
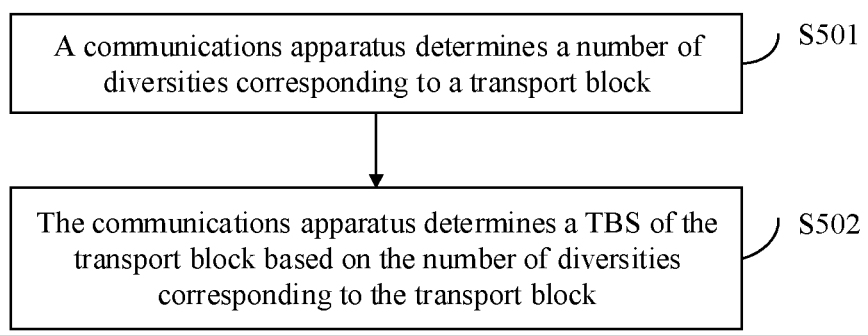
FIG. 8 is a flowchart of another method for determining a TBS according to an embodiment of this disclosure.

FIG. 8 shows a method for determining a TBS according to an embodiment of this disclosure. The method includes the following operations.

S501: A communications apparatus determines a quantity of diversities corresponding to a transport block.

The quantity of diversities is used to indicate a quantity of copies of the transport block that are transmitted in diversity transmission mode. It may be understood that a value of the quantity of diversities is a positive integer. For example, when the quantity of diversities is 1, it indicates that the quantity of copies of the transport block that are transmitted in diversity transmission mode is 1; when the quantity of diversities is 2, it indicates that the quantity of copies of the transport block are transmitted in diversity transmission mode is 2; and when the quantity of diversities is n, it indicates that the quantity of copies of the transport block that are transmitted in diversity transmission mode is n.

It should be noted that, when the quantity of copies of the transport block that are transmitted in diversity transmission mode is 1, it indicates that the network device does not send the transport block in diversity transmission mode.

In this embodiment of this disclosure, the quantity of diversities for the transport block may be determined by the communications apparatus, predefined, or preconfigured. The following uses an example in which the communications apparatus is a network device or a terminal for description.

(1) For example, the communications apparatus is a network device. The network device may determine, by considering factors such as channel quality and a network environment of a terminal, the quantity of diversities corresponding to the transport block. Alternatively, the network device may determine, based on higher layer signaling, the quantity of diversities corresponding to the transport block. The higher layer signaling is signaling at a higher layer protocol layer.

(2) For example, the communications apparatus is a terminal. The terminal receives first indication information sent by a network device, and determines, based on the first indication information, the quantity of diversities corresponding to the transport block. The first indication information is used to indicate the quantity of diversities corresponding to the transport block.

The first indication information may indicate, in an explicit manner, the quantity of diversities corresponding to the transport block. For example, the first indication information may include a specific value of the quantity of diversities.

Alternatively, the first indication information may indicate, in an implicit manner, the quantity of diversities corresponding to the transport block. For example, the first indication information includes a diversity parameter. When the diversity parameter is 0, it indicates that the transport block is not sent in diversity transmission mode. Therefore, the quantity of diversities is 1. When the diversity parameter is 1, it indicates that each transport layer carries a copy of data of the transport block. Therefore, the quantity of diversities is equal to a quantity of transport layers. If the diversity parameter is n, and n is an integer greater than or equal to 2, the quantity of diversities is n. For another example, the first indication information may indicate that the quantity of diversities corresponding to the transport block is equal to the quantity of transport layers. In this way, the communications apparatus may determine, based on the quantity of transport layers, the quantity of diversities corresponding to the transport block.

In addition, the network device may send a notification message to the terminal, so that the terminal learns whether the network device sends the transport block in diversity transmission mode. The notification message may be carried in RRC signaling, MAC-CE signaling, or DCI.

S502: The communications apparatus determines a TBS of the transport block based on the quantity of diversities corresponding to the transport block.

In an implementation, the communications apparatus determines an intermediate quantity of information bits of the transport block based on the quantity of diversities corresponding to the transport block. Then, the communications apparatus determines the TBS of the transport block based on the intermediate quantity of information bits of the transport block.

The intermediate quantity of information bits of the transport block may be determined according to the following formula (1):

$$N_{info} = N_{RE} \cdot R \cdot Q_m \cdot v/m \quad (1)$$

$N_{info}$ represents the intermediate quantity of information bits of the transport block, $N_{RE}$ represents a quantity of REs used to transmit data, R represents a bit rate, $Q_m$ represents a modulation order, v represents the quantity of transport layers, and m represents the quantity of diversities corresponding to the transport block. $N_{RE}$, $Q_m$, v, and m are positive integers, and R is a positive number.

The formula (1) may be replaced with the following formula (2):

$$N_{info} = \lfloor N_{RE} \cdot R \cdot v/m \rfloor \quad (2)$$

Alternatively, the formula (1) may be replaced with the following formula (3):

$$N_{info} = \lceil N_{RE} \cdot R \cdot Q_m \cdot v/r \rceil \quad (3)$$

$\lfloor \; \rfloor$ represents rounding down, and $\lceil \; \rceil$ represents rounding up.

In this embodiment of this disclosure, transport blocks with m RVs are mapped to obtain one code word, and the code word is mapped to v transport layers.

The m RVs may be a same RV. For example, all the m RVs may be an RV0.

Alternatively, the m RVs may be different RVs.

Figure 9:
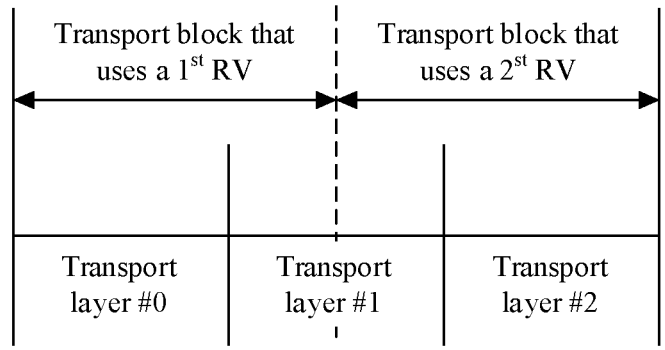
FIG. 9 is a schematic diagram of a layer diversity according to an embodiment of this disclosure.

An example is used for description with reference to FIG. 9. It is assumed that the quantity of transport layers is 3, and the quantity of diversities for the transport block is 2. In this case, a transport layer #0 and a transport layer #1 carry a part of data of the transport block, and the transport layer #1 and a transport layer #2 carry a part of data of the transport block. Specifically, the transport layer #0 carries first ⅔ of a transport block that uses a $1^{st}$ RV, the transport layer #1 carries last ⅓ of the transport block that uses the $1^{st}$ RV and first ⅓ of a transport block that uses a $2^{nd}$ RV, and the transport layer #2 carries last ⅔ of the transport block that uses the $2^{nd}$ RV.

Figure 10:
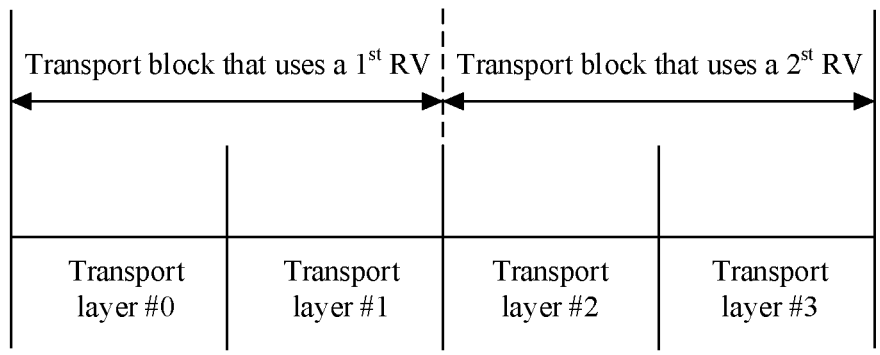
FIG. 10 is a schematic diagram of another layer diversity according to an embodiment of this disclosure.

An example is used for description with reference to FIG. 10. It is assumed that the quantity of transport layers is 4, and the quantity of diversities for the transport block is 2. In this case, a transport layer #0 and a transport layer #1 carry a part of data of the transport block, and a transport layer #2 and a transport layer #3 carry a part of data of the transport block. Specifically, the transport layer #0 carries first ½ of a transport block that uses a $1^{st}$ RV, the transport layer #1 carries last ½ of the transport block that uses the $1^{st}$ RV, the transport layer #2 carries first ½ of a transport block that uses a $2^{nd}$ RV, and the transport layer #3 carries last ½ of the transport block that uses the $2^{nd}$ RV.

In this embodiment of this disclosure, a transport block carried at each transport layer is determined based on a mapping relationship between a code word and a transport layer. It may be understood that the mapping relationship between a code word and a transport layer is preconfigured, or is defined in a standard.

For example, Table 4 shows a mapping relationship between a code word and a transport layer. In Table 4, the quantity of diversities corresponding to the transport block is equal to the quantity of transport layers. In Table 4, $x^{(0)}(i)$ represents an $i^{th}$ complex symbol of a transport layer, and by analogy, $x^{(n)}(i)$ represents an $i^{th}$ complex symbol of an $n^{th}$ transport layer. $a^{(0)}(i)$ represents an $i^{th}$ complex symbol corresponding to a transport block that uses a RV, and by analogy, $a^{(n)}(i)$ represents an $i^{th}$ complex symbol corresponding to a transport block that uses an $n^{th}$ RV. $i=0, 1, \ldots, M_{symb}^{layer}-1$, to be specific, i is an integer greater than or equal to 0 and less than or equal to $M_{symb}^{layer}-1$. $M_{symb}^{layer}$ represents a quantity of complex symbols carried at a transport layer. $M_{symb}$ indicates a quantity of complex symbols corresponding to a transport block with an RV.

It can be learned from Table 4 that if the quantity of diversities for the transport block is equal to the quantity of transport layers, each transport layer carries a transport block with one RV.

TABLE 4

| Quantity of transport layers | Quantity of code words | Mapping relationship between a code word and a transport layer |
|---|---|---|
| 2 | 1 | $x^{(0)}(i) = a^{(0)}(i) M_{symb}^{layer} = M_{symb}$ <br> $x^{(1)}(i) = a^{(1)}(i)$ |
| 3 | 1 | $x^{(0)}(i) = a^{(0)}(i) M_{symb}^{layer} = M_{symb}$ <br> $x^{(1)}(i) = a^{(1)}(i)$ <br> $x^{(2)}(i) = a^{(2)}(i)$ |
| 4 | 1 | $x^{(0)}(i) = a^{(0)}(i) M_{symb}^{layer} = M_{symb}$ <br> $x^{(1)}(i) = a^{(1)}(i)$ <br> $x^{(2)}(i) = a^{(2)}(i)$ <br> $x^{(3)}(i) = a^{(3)}(i)$ |
| . . . | . . . | . . . |

In this embodiment of this disclosure, the terminal may determine an index of each of m RVs in the following manner.

(1) The terminal receives second indication information sent by the network device, where the second indication information is used to indicate the index of each of the m RVs.

(2) The terminal receives third indication information sent by the network device, where the third indication information is used to indicate an index of a $1^{st}$ RV in the m RVs. Indexes of the m RVs meet a preset rule. The preset rule may be defined in a standard, or may be preconfigured.

That indexes of the m RVs meet a preset rule includes the following cases:

Case 1: The Indexes of the m RVs Meet a Preset Cyclic Order.

For example, the preset cyclic order is: RV0→RV2→RV3→RV1. To be specific, the 1st RV is the RV0, a $2^{nd}$ RV is the RV2, a $3^{rd}$ RV is the RV3, a $4^{th}$ RV is the RV1, and a $5^{th}$ RV is the RV0. By analogy, a $(4n+1)^{th}$ RV is the RV0, and a $(4n+2)^{th}$ RV is the RV2, a $(4n+3)^{th}$ RV is the RV3, and a $(4n+4)^{th}$ RV is the RV1, where n is an integer greater than or equal to 0.

Case 2: The Indexes of the m RVs Meet a Preset Sequence.

For example, the preset sequence is RV0→RV1→RV3→RV0→RV2→ . . . . It may be understood that only a part of the preset sequence is shown herein.

(3) If the quantity of diversities corresponding to the transport block is equal to the quantity of transport layers, each of the v transport layers corresponds to one piece of configuration information, where the configuration information is used to indicate an index of an RV corresponding to the transport layer.

In this embodiment of this disclosure, the network device may send, to the terminal, the configuration information corresponding to each of the v transport layers, so that the terminal determines, based on the configuration information corresponding to each of the v transport layers, an index of the RV corresponding to each transport layer.

Optionally, the configuration information corresponding to the transport layer is further used to indicate resource allocation and an MCS that correspond to the transport layer.

Optionally, the configuration information corresponding to the transport layer is carried in RRC signaling, MAC-CE signaling, or DCI.

(4) There is a correspondence between a DMRS port and an RV. It should be noted that, because a DMRS port may be used to identify a transport layer, when the quantity of diversities corresponding to the transport block is equal to the quantity of transport layers, the correspondence between a DMRS port and an RV may be used to determine an index of an RV corresponding to each of the v transport layers.

It should be noted that the correspondence between a DMRS port and an RV is preconfigured by the network device for the terminal, or is defined in a standard.

For example, Table 5 shows the correspondence between a DMRS port and an RV. An example is used for description with reference to Table 5. When an index value is 2, a DMRS port whose code is 0 corresponds to the RV0, and a DMRS port whose code is 1 corresponds to the RV3. In this way, a transport layer corresponding to the DMRS port whose code is 0 corresponds to the RV0, and a transport layer corresponding to the DMRS port whose code is 1 corresponds to the RV3.

TABLE 5

| Index value | DMRS port | RV |
|---|---|---|
| 0 | 0 | 0 |
| 1 | 1 | 0 |
| 2 | 0, 1 | 0, 3 |
| 3 | 0 | 0 |
| 4 | 1 | 0 |
| 5 | 2 | 0 |
| 6 | 3 | 0 |

TABLE 5-continued

| Index value | DMRS port | RV |
|---|---|---|
| 7 | 0, 1 | 0, 3 |
| 8 | 2, 3 | 0, 3 |
| 9 | 0 to 2 | 0, 2, 3 |
| 10 | 0 to 3 | 0, 2, 3, 1 |
| 11 | 0, 2 | 1 |
| 12 | 0 | 0 |
| 13 | 1 | 0 |
| 14 | 2 | 0 |
| 15 | 3 | 0 |
| 16 | 4 | 0 |
| 17 | 5 | 0 |
| 18 | 6 | 0 |
| 19 | 7 | 0 |
| 20 | 0, 1 | 0, 3 |
| 21 | 2, 3 | 0, 3 |
| 22 | 4, 5 | 0, 3 |
| 23 | 6, 7 | 0, 3 |
| 24 | 0, 4 | 0, 3 |
| 25 | 2, 6 | 0, 3 |
| 26 | 0, 1, 4 | 0, 2, 3 |
| 27 | 2, 3, 6 | 0, 2, 3 |
| 28 | 0, 1, 4, 5 | 0, 2, 3, 1 |
| 29 | 2, 3, 6, 7 | 0, 2, 3, 1 |
| 30 | 0, 2, 4, 6 | 0, 2, 3, 1 |
| 31 | Reserved | Reserved |

Based on the technical solution shown in FIG. 8, in a diversity transmission scenario, the communications apparatus can determine an appropriate TBS for the transport block based on the quantity of diversities corresponding to the transport block. In this way, if the communications apparatus is a network device, the network device may perform diversity transmission on the transport block based on the TBS of the transport block. If the communications apparatus is a terminal, the terminal may decode the transport block based on the TBS of the transport block.

The foregoing mainly describes the solutions provided in the embodiments of this disclosure from a perspective of interaction between the network elements. It may be understood that, to implement the foregoing functions, each of network elements such as the network device and the terminal includes a corresponding hardware structure and/or software module for performing each function. A person skilled in the art should easily be aware that, in combination with units and algorithm operations of the examples described in the embodiments disclosed in this specification, this disclosure may be implemented by hardware or a combination of hardware and computer software. Whether a function is performed by hardware or hardware driven by computer software depends on particular disclosures and design constraints of the technical solutions. A person skilled in the art may use a different method to implement the described functions for each particular disclosure, but it should not be considered that the implementation goes beyond the scope of this disclosure.

In the embodiments of this disclosure, functional modules of the network device and the terminal may be obtained through division based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this disclosure, module division is an example, and is merely logical function division. During actual implementation, another division manner may be used. An example in which each function module is obtained through division based on each corresponding function is used below for description.

Figure 11:
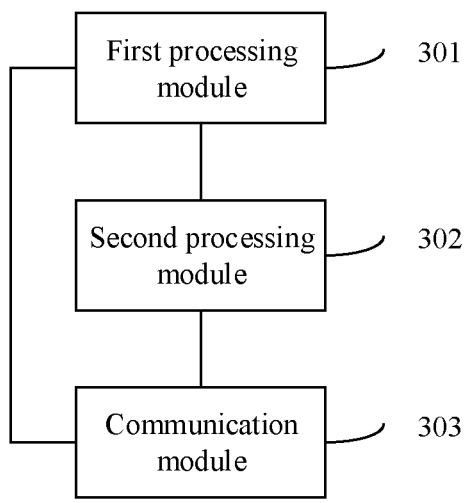
FIG. 11 is a schematic structural diagram of a terminal according to an embodiment of this disclosure.

FIG. 11 is a schematic structural diagram of a terminal according to an embodiment of this disclosure. As shown in FIG. 11, the terminal includes a first processing module 301 and a second processing module 302. Optionally, the terminal further includes a communication module 303. The first processing module 301 is configured to support the terminal in performing operation S101 in FIG. 3, operations S202 and S204 in FIG. 4, operation S301 in FIG. 6, and operation S501 in FIG. 8, or is configured to support another process in the technical solutions described in this specification. The second processing module 302 is configured to support the terminal in performing operation S102 in FIG. 3, operations S203, S205, and S206 in FIG. 4, operations S302 and S303 in FIG. 6, operation S402 in FIG. 7, and operation S502 in FIG. 8, or is configured to support another process in the technical solutions described in this specification. The communication module 303 is configured to support the terminal in performing operation S201 in FIG. 4 and operation S401 in FIG. 7, or is configured to support another process in the technical solutions described in this specification.

In this embodiment of this disclosure, the first processing module 301 and the second processing module 302 may be integrated into one processing module, and the processing module may be configured to implement the operations performed by the first processing module 301 and the second processing module 302. The processing module is configured to support the terminal in performing operations S101 and S102 in FIG. 3, operations S202 to S206 in FIG. 4, operations S301 to S303 in FIG. 6, operation S402 in FIG. 7, and operations S501 and S502 in FIG. 8, or is configured to support another process in the technical solutions described in this specification.

In an example, with reference to the terminal shown in FIG. 2, the communication module 303 in FIG. 11 may be implemented by using the transceiver 103 in FIG. 2, and the first processing module 301 and the second processing module 302 in FIG. 11 may be implemented by using the processor 101 in FIG. 2. This is not limited in the embodiments of this disclosure.

An embodiment of this disclosure further provides a computer-readable storage medium. The computer-readable storage medium stores computer instructions. When the computer-readable storage medium runs on the network device shown in FIG. 2, the network device is enabled to perform the method shown in FIG. 3, FIG. 4, FIG. 6, FIG. 7, or FIG. 8. The computer instructions may be stored in a computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive (SSD)), or the like.

An embodiment of this disclosure further provides a computer program product including computer instructions. When the computer program product runs on the terminal shown in FIG. 2, the terminal can perform the method shown in FIG. 3, FIG. 4, FIG. 6, FIG. 7, or FIG. 8.

The terminal, the computer storage medium, and the computer program product provided in the embodiments of this disclosure are all configured to perform the methods provided above. Therefore, for beneficial effects that can be achieved thereof, refer to the beneficial effects corresponding to the methods provided above. Details are not described herein again.

Figure 12:
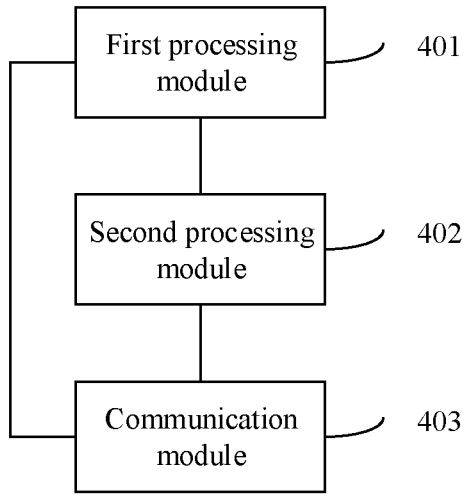
FIG. 12 is a schematic structural diagram of a network device according to an embodiment of this disclosure.

FIG. 12 is a schematic structural diagram of a network device according to an embodiment of this disclosure. As shown in FIG. 12, the network device includes a first processing module 401 and a second processing module 402. Optionally, the network device further includes a communication module 403. The first processing module 401 is configured to support the network device in performing operation S101 in FIG. 3, operation S301 in FIG. 6, and operation S501 in FIG. 8, or is configured to support another process in the technical solutions described in this specification. The second processing module 302 is configured to support the network device in performing operation S102 in FIG. 3, operations S302 and S303 in FIG. 6, and operation S502 in FIG. 8, or is configured to support another process in the technical solutions described in this specification. The communication module 403 is configured to support the network device in performing operation S201 in FIG. 4 and operation S401 in FIG. 7, or is configured to support another process in the technical solutions described in this specification.

In this embodiment of this disclosure, the first processing module 401 and the second processing module 402 may be integrated into one processing module, and the processing module may be configured to implement the operations performed by the first processing module 401 and the second processing module 402. For example, the processing module is configured to support the network device in performing operations S101 and S102 in FIG. 3, operations S301 to S303 in FIG. 6, and operations S501 and S502 in FIG. 8, or is configured to support another process in the technical solutions described in this specification.

In an example, with reference to the network device shown in FIG. 2, the communication module 403 in FIG. 12 may be implemented by using the transceiver 203 in FIG. 2, and the first processing module 401 and the second processing module 402 in FIG. 12 may be implemented by using the processor 201 in FIG. 2. This is not limited in the embodiments of this disclosure.

An embodiment of this disclosure further provides a computer-readable storage medium. The computer-readable storage medium stores computer instructions. When the computer-readable storage medium runs on the network device shown in FIG. 2, the network device is enabled to perform the method shown in FIG. 3, FIG. 4, FIG. 6, FIG. 7, or FIG. 8. The computer instructions may be stored in the computer-readable storage medium, or may be transmitted from a computer-readable storage medium to another computer-readable storage medium. For example, the computer instructions may be transmitted from a website, a computer, a server, or a data center in a wired (for example, coaxial cable, optical fiber, or digital subscriber line) manner or a wireless (for example, infrared, radio, or microwave) manner to another website, computer, server, or data center. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

An embodiment of this disclosure further provides a computer program product including computer instructions. When the computer program product runs on the network device shown in FIG. 2, the network device can perform the method shown in FIG. 3, FIG. 4, FIG. 6, FIG. 7, or FIG. 8.

The network device, the computer storage medium, and the computer program product provided in the embodiments of this disclosure are all configured to perform the methods provided above. Therefore, for beneficial effects that can be achieved thereof, refer to the beneficial effects corresponding to the methods provided above. Details are not described herein again.

Figure 13:
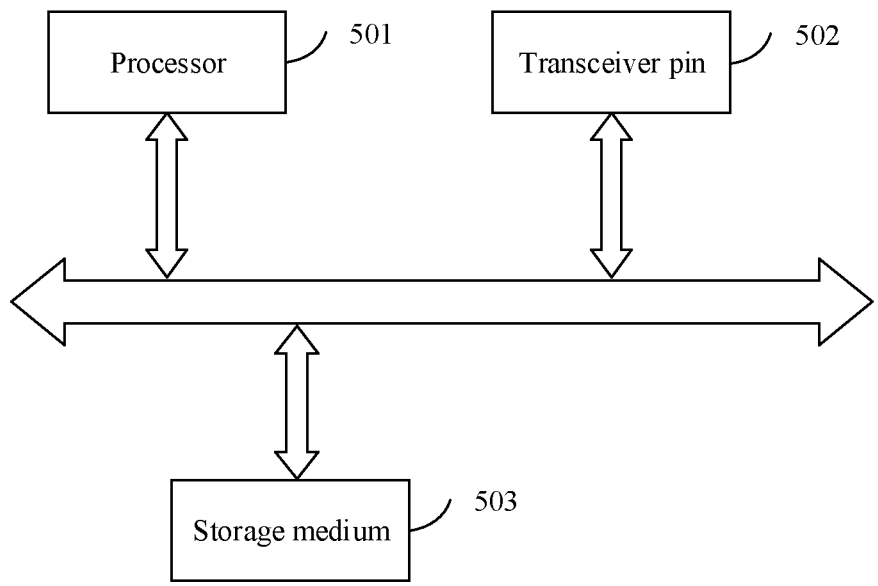
FIG. 13 is a schematic structural diagram of a chip according to an embodiment of this disclosure.

FIG. 13 is a schematic structural diagram of a chip according to an embodiment of this disclosure. The chip shown in FIG. 13 may be a general-purpose processor, or may be a dedicated processor. The chip includes a processor 501. The processor 501 is configured to support a communications apparatus in performing the technical solution shown in FIG. 3, FIG. 4, FIG. 6, FIG. 7, or FIG. 8.

Optionally, the chip further includes a transceiver pin 502. The transceiver pin 502 is configured to be controlled by the processor 501, to support the communications apparatus in executing the technical solution shown in FIG. 3, FIG. 4, FIG. 6, FIG. 7, or FIG. 8.

Optionally, the chip shown in FIG. 13 may further include a storage medium 503.

It should be noted that the chip shown in FIG. 13 may be implemented by using the following circuit or component: one or more field programmable gate arrays (FPGA), a programmable logic device (PLD), a controller, a state machine, gate logic, a discrete hardware component, any other appropriate circuit, or any combination of circuits that can perform various functions described in this disclosure.

Although this disclosure is described with reference to the embodiments, a person skilled in the art may understand and implement another variation of the disclosed embodiments by viewing the accompanying drawings, disclosed content, and the appended claims. In the claims, the word "comprising" does not exclude another component or operation. A single processor or another unit may implement several functions enumerated in the claims. Some measures are recorded in dependent claims that are different from each other, but this does not mean that these measures cannot be combined to produce a great effect.

It should be noted that, in the descriptions of this disclosure, unless otherwise specified, "/" means "or". For example, A/B may represent A or B. In addition, "at least one" means one or more, and "a plurality of" means two or more. Words such as "first" and "second" do not limit a number and an execution sequence, and the words such as "first" and "second" do not indicate a definite difference.

In this disclosure, the words such as "example" or "for example" are used to give an example, an illustration, or descriptions. Any embodiment or design scheme described as an "example" or "for example" in this disclosure should not be explained as being more preferred or having more advantages than another embodiment or design scheme. Exactly, use of the words such as "example" or "for example" is intended to present a related concept in a specific manner.

Although this disclosure is described with reference to specific features and the embodiments thereof, it is clear that various modifications and combinations may be made to them without departing from the spirit and scope of this disclosure. Correspondingly, the specification and accompanying drawings are merely descriptions of examples of this disclosure defined by the appended claims, and are considered as any of or all modifications, variations, combinations, or equivalents that cover the scope of this disclosure. It is clear that a person skilled in the art can make various modifications and variations to this disclosure without departing from the spirit and scope of this disclosure. This disclosure is intended to cover these modifications and variations of this disclosure, provided that they fall within the scope of protection defined by the following claims and their equivalent technologies in this disclosure.

What is claimed is:

1. A communications method, wherein the method comprises:
    determining a first transport block size (TBS) of a transport block corresponding to a first code word, based on a time-frequency resource of the first code word and a modulation and coding scheme (MCS) of the first code word; and
    determining a second TBS of a transport block corresponding to a second code word, based on the first TBS of the transport block corresponding to the first code word, wherein the first code word and the second code word correspond to a same transport block.

2. The method according to claim 1, wherein the method further comprises:
    determining a bit rate of the second code word based on the second TBS, a time-frequency resource of the second code word, and a modulation scheme of the second code word.

3. The method according to claim 1, wherein the modulation scheme of the second code word is the same as a modulation scheme of the first code word.

4. The method according to claim 1, wherein the first code word and the second code work correspond to different frequency resources at a same time unit.

5. The method according to claim 1, wherein the first TBS of the transport block corresponding to the first code word is the same as the second TBS of the transport block corresponding to the second code word.

6. The method according to claim 1, wherein the method further comprises:
    sending or receiving first indication information, wherein the first indication information implicitly indicates a quantity of diversities corresponding to the transport block.

7. The method according to claim 6, wherein the quantity of diversities corresponding to the transport block is 2.

8. A communication apparatus, comprising:
    at least one processor configured with processor-executable instructions to perform operations comprising:
    determining a first transport block size (TBS) of a transport block corresponding to a first code word, based on a time-frequency resource of the first code word and a modulation and coding scheme (MCS) of the first code word; and
    determining a second TBS of a transport block corresponding to a second code word, based on the first TBS of the transport block corresponding to the first code word, wherein the first code word and the second code word correspond to a same transport block.

9. The communication apparatus according to claim 8, wherein
    the operations further comprises:
    determining a bit rate of the second code word based on the second TBS, a time-frequency resource of the second code word, and a modulation scheme of the second code word.

10. The communication apparatus according to claim 8, wherein the modulation scheme of the second code word is the same as a modulation scheme of the first code word.

11. The communication apparatus according to claim 8, wherein the first code word and the second code work correspond to different frequency resources at a same time unit.

12. The communication apparatus according to claim 8, wherein the first TBS of the transport block corresponding to the first code word is the same as the second TBS of the transport block corresponding to the second code word.

13. The communication apparatus according to claim 8, wherein the operations further comprise:
    sending or receiving first indication information, wherein the first indication information implicitly indicates a quantity of diversities corresponding to the transport block.

14. The communication apparatus according to claim 13, wherein the quantity of diversities corresponding to the transport block is 2.

15. A non-transitory computer-readable storage medium storing computer instructions, that when executed by at least one processor, cause the at least one processor to perform operations comprising:
    determining a first transport block size (TBS) of a transport block corresponding to a first code word, based on a time-frequency resource of the first code word and a modulation and coding scheme (MCS) of the first code word; and
    determining a second TBS of a transport block corresponding to a second code word, based on the first TBS of the transport block corresponding to the first code word, wherein the first code word and the second code word correspond to a same transport block.

16. The non-transitory computer-readable storage medium according to claim 15, wherein the method further comprises:
    determining a bit rate of the second code word based on the second TBS, a time-frequency resource of the second code word, and a modulation scheme of the second code word.

17. The non-transitory computer-readable storage medium according to claim 15, wherein the modulation scheme of the second code word is the same as a modulation scheme of the first code word.

18. The non-transitory computer-readable storage medium according to claim 15, wherein the first code word and the second code work correspond to different frequency resources at a same time unit.

19. The non-transitory computer-readable storage medium according to claim 15, wherein the first TBS of the transport block corresponding to the first code word is the same as the second TBS of the transport block corresponding to the second code word.

20. The non-transitory computer-readable storage medium according to claim 15, wherein the method further comprises:
    sending or receiving first indication information, wherein the first indication information implicitly indicates a quantity of diversities corresponding to the transport block.

* * * * *